(12) United States Patent
Potter

(10) Patent No.: US 7,097,261 B2
(45) Date of Patent: Aug. 29, 2006

(54) MODULATOR

(75) Inventor: Laurence John Potter, Birmingham (GB)

(73) Assignee: Haldex Brake Products, Ltd, (GB)

( * ) Notice: Subject to any disclaimer, the term of this patent is extended or adjusted under 35 U.S.C. 154(b) by 0 days.

(21) Appl. No.: 10/967,421

(22) Filed: Oct. 18, 2004

(65) Prior Publication Data

US 2005/0110340 A1  May 26, 2005

(30) Foreign Application Priority Data

Oct. 18, 2003  (GB) .................................. 0324428.2

(51) Int. Cl.
*B60T 8/34* (2006.01)

(52) U.S. Cl. ................. 303/118.1; 303/119.2

(58) Field of Classification Search .. 303/119.1–119.3, 303/118.1, 115.1, 115.2, 3, 15, 40; 188/352; 137/627.5

See application file for complete search history.

(56) References Cited

U.S. PATENT DOCUMENTS

| | | | | |
|---|---|---|---|---|
| 3,907,381 | A | 9/1975 | Bablitzka | 303/40 |
| 4,175,795 | A * | 11/1979 | Mortimer et al. | 303/118.1 |
| 5,100,208 | A * | 3/1992 | Angermair | 303/36 |
| 5,286,102 | A | 2/1994 | Nakamura | 303/113.2 |
| 5,443,306 | A * | 8/1995 | Broome | 303/3 |
| 6,206,481 | B1 * | 3/2001 | Kaisers et al. | 303/7 |
| 6,217,764 | B1 * | 4/2001 | Bellhouse | 210/321.69 |
| 6,238,013 | B1 * | 5/2001 | Koelzer | 303/118.1 |
| 6,386,649 | B1 | 5/2002 | Ross | 303/119.2 |
| 6,588,856 | B1 * | 7/2003 | Herbst et al. | 303/119.2 |

FOREIGN PATENT DOCUMENTS

| | | |
|---|---|---|
| DE | 24 03 675 A1 | 7/1975 |
| DE | 25 41 563 A1 | 3/1977 |
| DE | 42 26 714 A1 | 2/1993 |
| GB | 2 331 562 A | 5/1999 |
| WO | WO 01/25067 A | 4/2001 |

OTHER PUBLICATIONS

European Search Report, Jun. 3, 2005, 1 page.

* cited by examiner

*Primary Examiner*—Robert A. Siconolfi
(74) *Attorney, Agent, or Firm*—St. Onge Steward Johnston & Reens LLC

(57) ABSTRACT

A modulator comprising an inlet, an exhaust and an outlet, the modulator comprising a piston moveable in response to a control pressure in a control chamber to vary to supply of fluid under pressure to the outlet, wherein the modulator comprises a first end face and a second end face wherein the exhaust and the inlet are provided in the first end face and the outlet is provided in the second end face. The modulator further comprising a hold solenoid connected between the inlet and the control chamber, and a dump solenoid connected between the control chamber and the exhaust, wherein the connections between the hold solenoid, the exhaust and the control chamber and the connections between the dump solenoid, the control chamber and the inlet do not cross the plane of the piston.

14 Claims, 3 Drawing Sheets

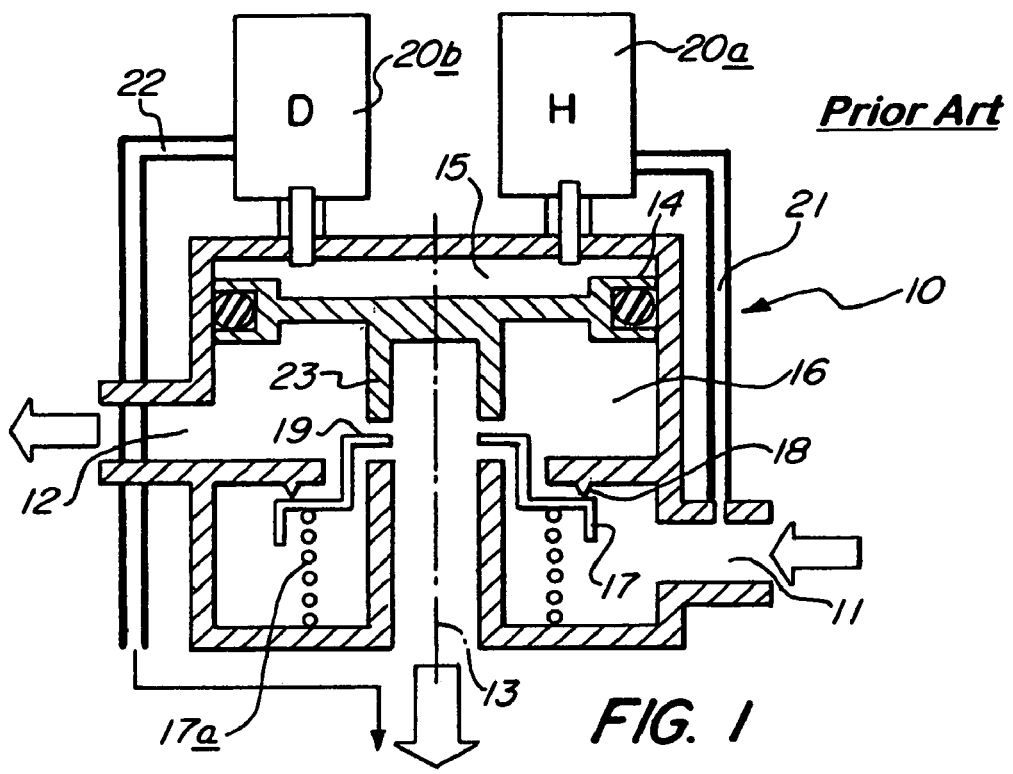
FIG. 1 *Prior Art*
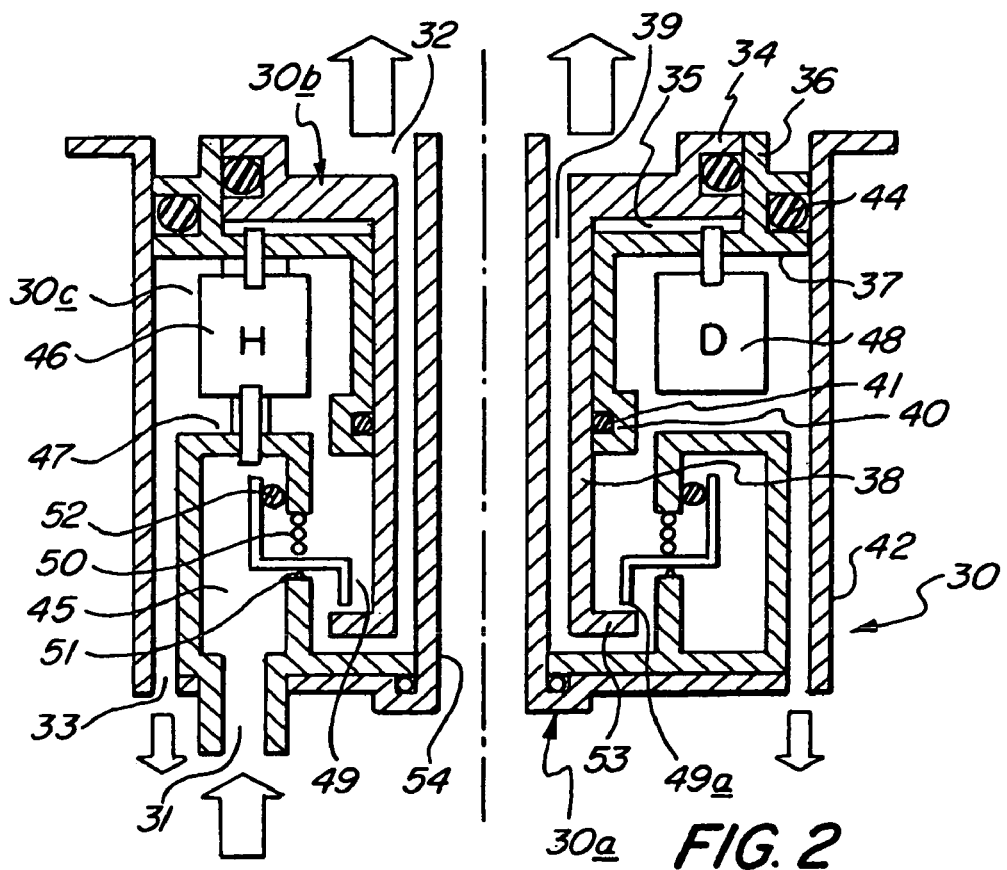
FIG. 2

MODULATOR

This application claims priority of British Patent Application No. 0324428.2 filed on Oct. 18, 2003.

FIELD OF THE INVENTION

This invention relates to a modulator and a brake actuator.

It is known to use a modulator to control pressure of fluid under pressure, particularly air in pneumatic systems.

DESCRIPTION OF THE PRIOR ART

With reference to a standard arrangement shown in FIG. 1, a modulator is generally shown at 10 having an inlet 11, an outlet 12 and an exhaust 13. The modulator comprises a piston 14 which is responsive to pressure in a control chamber 15 located above the piston and a delivery chamber 16 located below the piston. A valve member shown at 17 is biased against a first valve seat 18 to isolate the inlet 11 from the delivery chamber 16. The valve member 17 also has a second valve seat 19 engagable by a control member 23 attached to the piston 14 to isolate the delivery chamber 16 from the exhaust 13. If the piston 14 generates sufficient force, it can act on the valve member 17 to move the valve member 17 away from the first valve seat 18 to connect the inlet to the delivery chamber 16 and isolate the exhaust 13. To control the pressure in the control chamber 15, a hold solenoid 20a and a dump solenoid 20b are provided. The hold solenoid 20a, is operable to control the supply of pressure from the inlet 11 to the control chamber 15 via a line 21, while the dump solenoid 20b is operable to vent the control chamber 15 via line 22 to the exhaust 13. In operation, when it is desired to supply fluid under pressure from the inlet 11 to outlet 12, the hold solenoid 20a is operated to supply pressure to the control chamber 15. The piston 14 is urged downwards under the influence of the pressure in the control chamber 15, first engaging valve seat 19 to separate the chamber 16 from the exhaust 13, and then disengaging the valve member 17 from the first valve seat 18 to permit the supply of pressure from the inlet 11 to the chamber 16. The increasing pressure in chamber 16 acts on the piston 14 which is urged upwards against the pressure in control chamber 15 until the pressure in the control chamber 15 matches the pressure in the delivery chamber 16. When it is desired to end the supply of pressure to the outlet 12, the dump solenoid 20b is opened and the hold solenoid 20a is closed connecting the control chamber 15 to exhaust the control chamber 15. The piston 14 is urged upwards by residual pressure in the delivery chamber 16. The valve member 17 is permitted to move upwards under the force of spring 17a to disconnect the inlet 12 from the delivery chamber 16 and to connect the delivery chamber 16 to the exhaust 13.

This configuration is known and is advantageous in that it provides for controlling relatively large pressures and volumes of pressurized fluids with a quick response time and using little energy, in this example using small low-voltage and low power dc solenoids.

Such a configuration is however disadvantageous in some circumstances. It is desirable in some brake actuators to fit a modulator within the case of the actuator and particularly ideally into a volume which comprises a tube. However, the location of the inlet, exhaust and outlet on the different faces of the modulator, together with the requirement for air supply lines 21 and exhaust line 22 to pass through the plane of the piston 14, means that, for example, the area of the piston 14 must be reduced which is undesirable in modulator design.

SUMMARY OF THE INVENTION

According to a first aspect of the invention we provide a modulator comprising an inlet, an exhaust and an outlet, the modulator comprising a piston moveable in response to a control pressure in a control chamber to vary to supply of fluid under pressure to the outlet, wherein the modulator comprises a first end face and a second end face, the exhaust and the inlet being provided in the first end face and the outlet being provided in the second end face, the modulator further comprising a hold solenoid connected between the inlet and the control chamber, and a dump solenoid connected between the control chamber and the exhaust wherein the connections between the hold solenoid, the exhaust and the control chamber and the connectors between the dump solenoid, the control chamber and the inlet do not cross the plane of the piston.

Preferably the first end face and the second end face define a volume therebetween, the hold solenoid and dump solenoid being located in the volume.

The modulator may further comprise a peripheral wall extending between the first end face and the second end face.

The modulator may comprise a valve member moveable to engage a first valve seat and moveable from the valve seat by a control member connected to the piston to connect the control chamber to the inlet.

The valve member may be provided with a second valve seat engagable by the control member wherein, when the control member is not in contact with the second valve seat, the control chamber may be connected to the exhaust.

The control member may be moveable to engage the second valve seat and act on the valve member to move the valve member away from the first valve seat.

The control chamber may comprise a peripheral wall and a transverse wall extending inwardly from the peripheral wall and wherein the control member may pass through an aperture in the transverse wall.

The inlet may be connected to an annular supply chamber and the hold solenoid is connected to the annular supply chamber.

The valve member may be generally annular and may be received in an opening in the said annular supply chamber.

The modulator may comprise an annular exhaust chamber connected to the exhaust wherein the dump solenoid may be connected to the annular exhaust chamber.

The hold solenoid and dump solenoid may be disposed in the annular exhaust chamber.

According to a second aspect of the invention we provide a brake actuator comprising a pressure responsive member moveable in a brake chamber, and a modulator valve volume, the modulator valve volume having a peripheral wall, a modulator according to the first aspect of the invention being disposed within the modulator valve volume.

The brake actuator may comprise a brake operating member moveable by the pressure responsive member and the modulator valve volume may be located opposite side of the brake chamber to the brake operating member.

The modulator valve volume may comprise a tubular inner member extending through the control member to receive a caging element of the pressure responsive element.

BRIEF DESCRIPTION OF THE DRAWINGS

The invention will now be described by way of the example only with reference to the accompanying drawings wherein FIG. 1 is a diagrammatic illustration of a known modulator, FIG. 2 is a diagrammatic illustration of a modulator embodying the present invention.

DESCRIPTION OF THE PREFERRED EMBODIMENT

Figure 3:
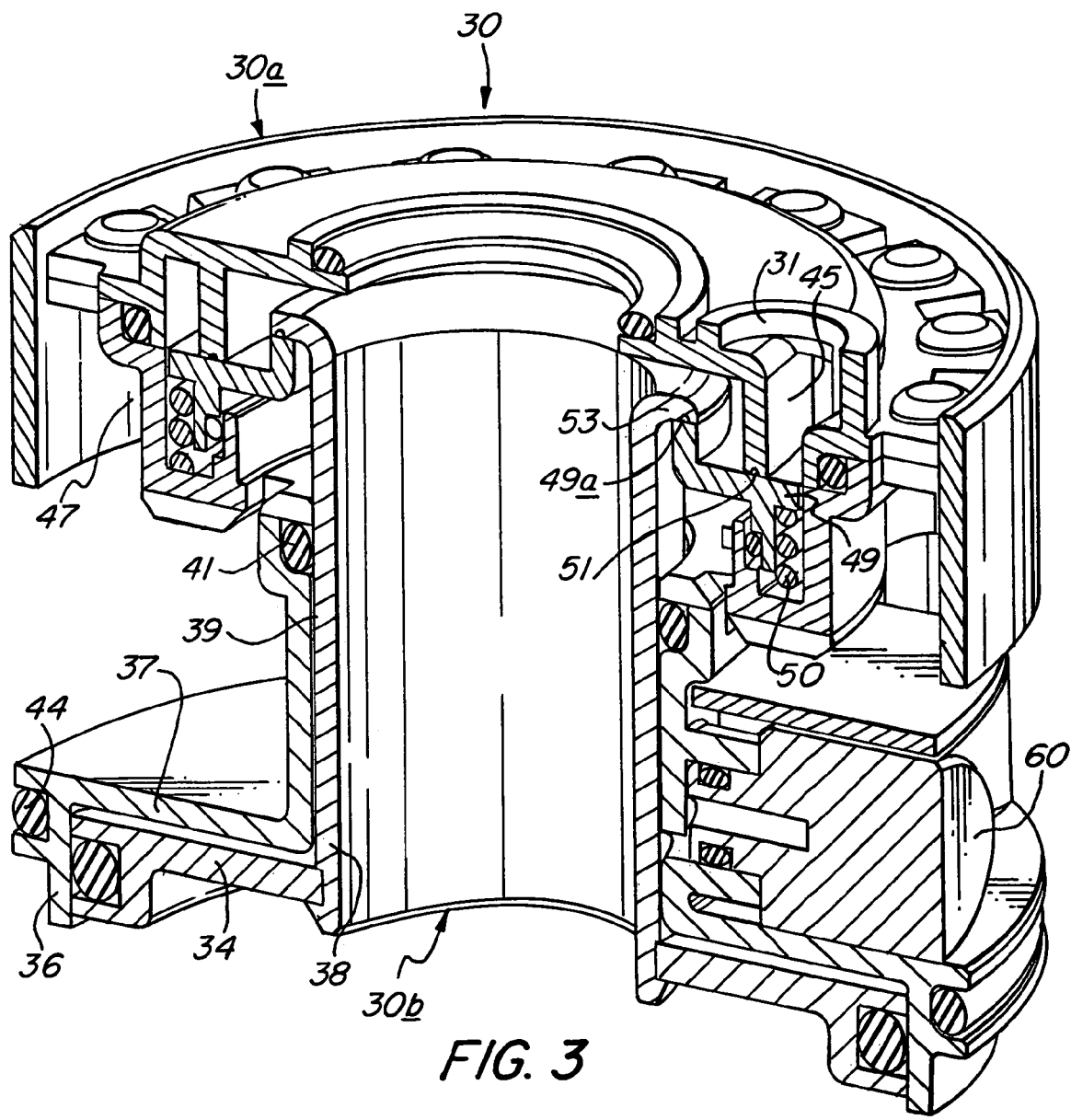
FIG. 3 is a cut away perspective view of a brake actuator embodying the present invention.

Referring now to FIGS. 2 and 3, a modulator embodying the present invention is generally illustrated at 30. The modulator 30 comprises an inlet 31, an outlet 32 and an exhaust 33. The inlet 31 and exhaust 33 are located at a first end face 30a of the modulator 30 and the outlet 32 is located at the second end face 30b of the modulator 30. The first end face 30a and second end face 30b define a volume 30c extending there between. The modulator 30 has a piston 34 moveable in response to the pressure in a control volume 35. To define the control volume 35, the modulator comprises a peripheral wall part 36 and a transverse wall 37 part expending transversely from the peripheral wall. A control member 38 passes through an aperture 39 in the transverse wall part 37. An extension 40 to the transverse wall 37 is provided with a seal 41 to provide a seal with the control member 38. In FIG. 2, a wall 42 of the brake actuator is shown and a seal 44 is provided at the edge of the peripheral wall 36 to provide a fixed seal between the brake actuator wall 42 and the peripheral wall 36. The inlet 31 is connected to an annular reservoir chamber 45. Located between the annular reservoir chamber 45 and the control volume 35 is a hold solenoid 46, operable to connect the annular reservoir chamber 45 to the control chamber 35 to supply fluid under pressure to the control chamber 35. The wall 42, transverse wall 37 extension part 40 and control member 38 also define an annular exhaust chamber 47 which is connected to the exhaust 33. A dump solenoid 48 is connected between the control chamber 35 and the exhaust chamber 47 to connect the control chamber 35 to exhaust.

To permit the supply of fluid under pressure from the annular reservoir chamber 45 to the outlet 32, a valve member 49 is provided mounted in a slot extending around the inner face of the annular reservoir chamber 45. A spring 50 urges the valve member 49 into contact with a first valve seat 51, whilst a seal 52 provides a sliding seal between the valve member 49 and an internal face of the annular reservoir chamber 45. When the valve member 49 is in the position shown in FIG. 2 there is no pressure flow from the annular reservoir chamber 45 to the outlet 32.

The valve member 49 provides a second valve seat 49a which is engagable by a flange 53 extending outwardly from the end of the control member 38. The flange 53 is disposed such that it acts on the second valve seat 49a and valve member 49 to urge it in an upward direction as shown in FIG. 2 to disengage it from the first valve seat 51.

In the example of FIGS. 2 and 3, the brake actuator wall comprises a tubular inner part 54 extending through the control member 38 which may be used, for example, for caging a brake actuator as discussed in more detail hereafter.

The modulator 30 acts in a similar manner to the modulator 10 of FIG. 1. When it is desired to provide fluid under pressure to the outlet 32, the hold solenoid 46 is actuated to supply pressure to the control chamber 35. The piston 34 is urged in an upward direction as shown in FIG. 2 thus lifting the control member 38 and the flange 53. The flange 53 first engages the second valve seat 49a, thus closing off the outlet 32 from the annular exhaust chamber 47, and then lifts the valve member 49 so that it disengages from the first valve seat 51. The fluid under pressure can then pass from the inlet 31 and reservoir chamber 45 through the control member 38 and out to the outlet 32. Where the piston 34 is responsive to the pressure in the outlet 32, for example when used in a brake actuator as described below, then, as the pressure at the outlet 32 increases, the piston 34 will be urged in a downward direction until the valve member 49 engages the valve seat 51 and an equilibrium is reached between the pressure in the control chamber 35 and the pressure of the outlet 32.

When it is desired to release the pressure from the outlet 32, the hold solenoid 46 is closed and the dump solenoid 48 is opened, connecting the control chamber 35 to the annular exhaust chamber 47. The pressure in the outlet 32 will urge the piston 34 in a downward direction, carry the valve member 49 to engage the first valve seat 51 and then disengaging the flange 53 from the second valve seat 52 to connect to the outlet 32 to the annular exhaust chamber 47.

Figure 4:
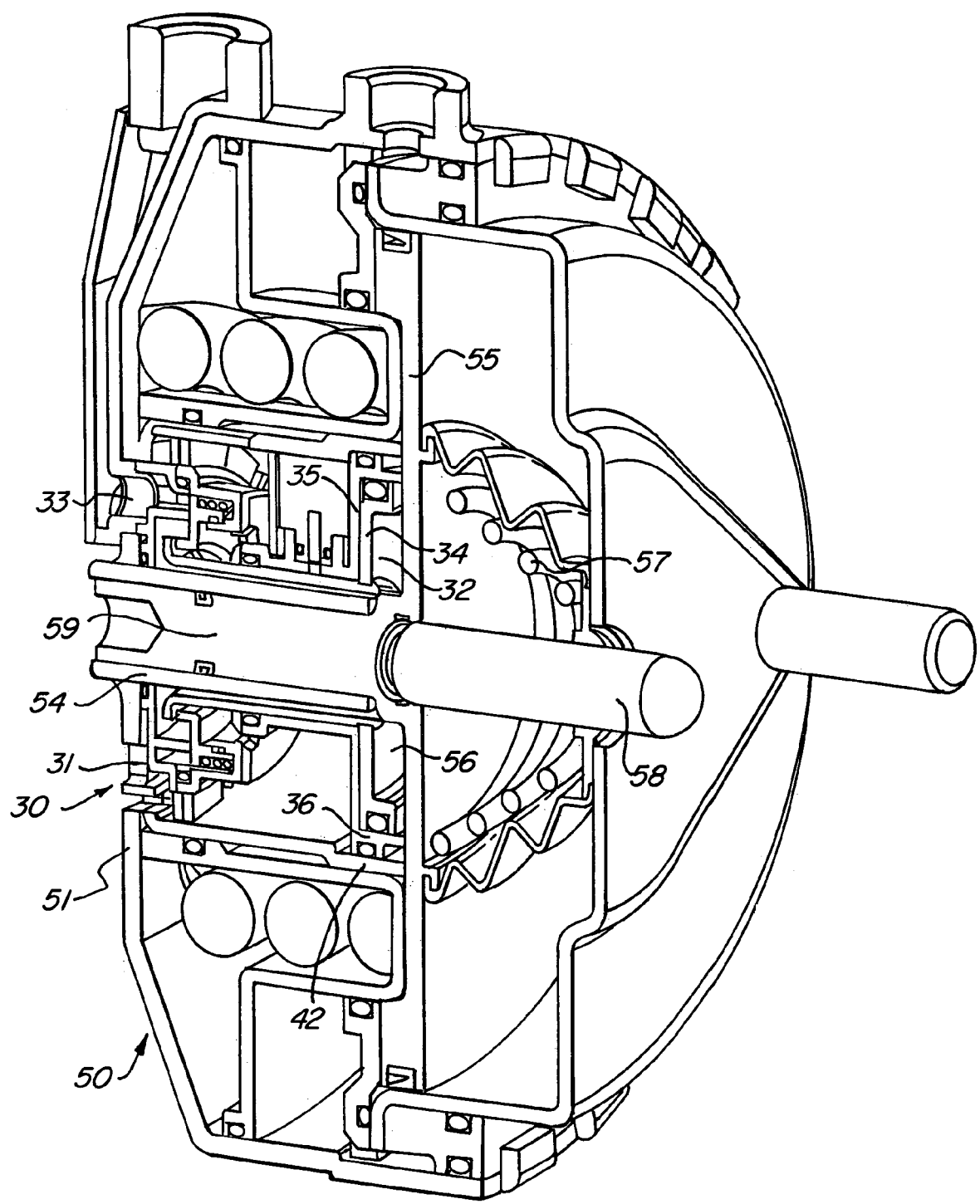
FIG. 4 is a cut away perspective view of a brake actuator embodying the present invention.

With reference to FIG. 4, a modulator 30 is shown provided within a brake actuator generally shown at 50. The brake actuator comprises a case 51 including a peripheral wall 42 and a tubular element shown at 54. The brake actuator further comprises a pressure responsive member 55 responsive to pressure in a brake pressure chamber 56 which is in essence contiguous with the outlet 32. Thus, the piston 34 is responsive to pressure both in the control chamber 35 and brake pressure chamber 56. The pressure responsive member 55 is urged to the left as seen in the figure by spring 57 and is urged to the right by pressure in the brake pressure chamber 56 to extend a brake actuating rod shown at 58. A caging element 59 connected to the pressure responsive member 55 extends through the tubular member 54 to allow the brake to be caged as necessary, for example when the brake actuator 50 comprises a parking brake. The modulator 30 is compactly received and mounted in the brake actuator 50, and is permitted to do so by the location of the inlet 31 and exhaust 33 on one face and the outlet 32 on the opposite face on the actuator. It is a particularly advantageous arrangement as there is no need for an air signal to pass through the plane of the main piston, thus making as much of the diameter of the modulator available for the piston as possible.

It will be apparent that the peripheral wall could in fact be provided by wall 42 of the case 51, but by using a separate peripheral wall 36, the need to manufacture the internal face of the wall 42 at a sufficient tolerance is removed. It will also be apparent, that where for example no caging is required, the tubular member 54 may be omitted and the diameter of the control member 38 narrowed if need be.

In the example of FIG. 3, a pressure transducer is shown at 60. This is responsive to the pressure in the control volume 35 and can be used in, for example, an electronic braking system.

The particular advantage of this configuration is that no air connections between either of the solenoids and the exhaust, the control chamber or the inlet pass through the plane of the piston. By making the piston as large as possible, the effect of opposition forces on the piston such as O-ring drag are relatively smaller, and the piston response is faster.

In the present specification "comprises" means "includes or consists of" and "comprising" means "including or consisting of".

What is claimed is:

1. A modulator comprising an inlet, an exhaust and an outlet, the modulator comprising a piston moveable in response to a control pressure in a control chamber to vary supply of fluid under pressure to the outlet, the piston having a piston surface which is generally perpendicular to the direction of movement of the piston, the piston surface partially forming the control chamber, wherein the modulator comprises a first end face and a second end face, the exhaust and the inlet being provided in the first end face and the outlet being provided in the second end face, the modulator further comprising a hold solenoid connected between the inlet and the control chamber by means of connections, and a dump solenoid connected between the control chamber and the exhaust by means of connections, wherein the connections between the hold solenoid, the inlet and the control chamber and the connections between the dump solenoid, the control chamber and the exhaust do not cross an infinite imaginary plane on which the piston surface lies.

2. A modulator according to claim 1 wherein the first end face and the second end face define a volume therebetween and wherein the hold solenoid and dump solenoid are located in the volume.

3. A modulator according to claim 2, further comprising a peripheral wall extending between the first end face and the second end face.

4. A modulator according to claim 1 comprising a valve member moveable to engage a first valve seat and moveable from the valve seat by a control member connected to the piston to connect the control chamber to the inlet.

5. A modulator according to claim 4 wherein the valve member is provided with a second valve seat engagable by the control member wherein, when the control member is not in contact with the second valve seat, the control chamber is connected to the exhaust.

6. A modulator according to claim 5 wherein the control member is moveable to engage the second valve seat and act on the valve member to move the valve member away from the first valve seat.

7. A modulator according to claim 4 wherein the control chamber comprises a peripheral wall and a transverse wall extending inwardly from the peripheral wall and wherein the control member passes through an aperture in the transverse wall.

8. A modulator according to claim 1 wherein the inlet is connected to an annular supply chamber and the hold solenoid is connected to the annular supply chamber.

9. A modulator according to claim 4 wherein the valve member is generally annular and is received in an opening in the said annular supply chamber.

10. A modulator according to claim 1 comprising an annular exhaust chamber connected to the exhaust wherein the dump solenoid is connected to the annular exhaust chamber.

11. A modulator according to claim 10 wherein the hold solenoid and dump solenoid are disposed in the annular exhaust chamber.

12. A brake actuator comprising a pressure responsive member moveable in a brake chamber, and a modulator valve volume, the modulator valve volume having a peripheral wall, and a modulator disposed within the modulator valve volume, said modulator comprising an inlet, an exhaust and an outlet, the modulator comprising a piston moveable in response to a control pressure in a control chamber to vary supply of fluid under pressure to the outlet, said piston comprising a piston surface that lies generally perpendicular to the direction of movement of the piston, said piston surface partially forming the control chamber, wherein the modulator comprises a first end face and a second end face, the exhaust and the inlet being provided in the first end face and the outlet being provided in the second end face, the modulator further comprising a hold solenoid connected between the inlet and the control chamber by means of connections, and a dump solenoid connected between the control chamber and the exhaust by means of connections, wherein the connections between the hold solenoid, the inlet and the control chamber and the connections between the dump solenoid, the control chamber and the exhaust do not cross an infinite imaginary plane on which the piston surface lies.

13. A brake actuator according to claim 12 comprising a brake operating member moveable by the pressure responsive member and where the modulator valve volume is located opposite side of the brake chamber to the brake operating member.

14. A brake actuator according to claim 12 wherein the modulator valve volume comprises a tubular inner member extending through the control member to receive a caging element of the pressure responsive element.

* * * * *